W. A. MODEL.
MACHINE FOR MAKING ICE CREAM.
APPLICATION FILED OCT. 19, 1911.
1,036,677.
Patented Aug. 27, 1912.
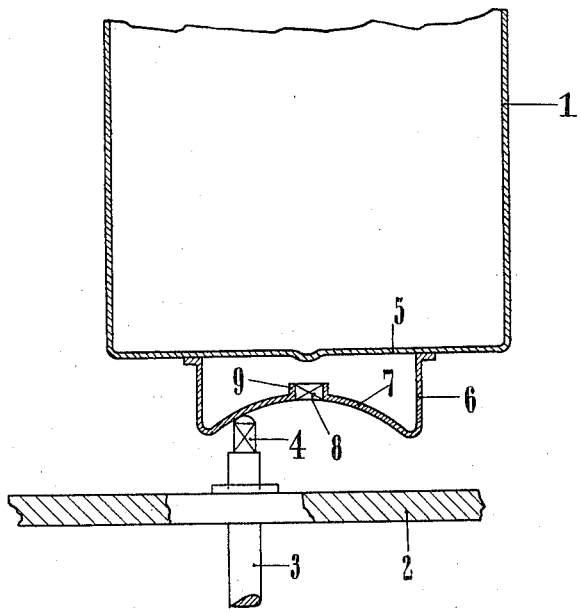
Witnesses:
Inventor:
Wilhelm August Model.
by
Attorney.

UNITED STATES PATENT OFFICE.

WILHELM AUGUST MODEL, OF FEUERBACH, NEAR STUTTGART, GERMANY.

MACHINE FOR MAKING ICE-CREAM.

1,036,677.  Specification of Letters Patent.  Patented Aug. 27, 1912.

Application filed October 19, 1911. Serial No. 655,493.

*To all whom it may concern:*

Be it known that I, WILHELM AUGUST MODEL, a subject of the King of Wurttemberg, and residing at Feuerbach, near Stuttgart, in the German Empire, have invented certain new and useful Improvements in Machines for Making Ice-Cream, of which the following is a specification.

The present invention refers to that class of machines for making ice-cream in which the receptacle for the ice-cream is driven from below. With such machines it is necessary that the ice-cream receptacle should be provided with a socket, at the bottom by which it may be coupled with the driving shaft. For example the driving shaft is provided with a squared or keying end and the ice-cream receptacle has a coupling member provided with a correspondingly shaped hole or socket in the bottom thereof which fits over the squared or keying end of the shaft.

The object of the present invention is to provide a means by which the ice-cream receptacle can be easily and quickly put on and taken off from the squared or keying end of the driving shaft without trouble or inconvenience, and in which the coupling member forms a base or support for the ice-cream receptacle.

The present invention is such that the coupling member may be conveniently made from a stamped, curved piece of metal, provided at the center with a squared or keying socket for coupling it with the squared or keying end of the driving shaft.

The accompanying drawing shows in section one form of the device by way of example.

1 is the receptacle for the ice-cream, 2 the bottom of the outer casing, in which the receptacle is carried, 3 is the driving shaft, which is driven from beneath the casing and 4 is the squared or keying end thereof.

Upon the bottom 5 of the ice-cream receptacle 1 is a coupling member 6 of curved formation and light construction, formed from stamped sheet metal, which is attached to the receptacle by riveting, soldering or brazing, and provided with a curved shell-like bottom 7, having at the center a squared or keying socket 8 provided with inner walls 9 and to which the bottom 7 converges. The curved bottom 7 of the coupling member 6 serves as a base for the receptacle 1 and also as a quick and easy means for putting on and taking off the ice-cream receptacle from the keying end 4 because, when the receptacle is placed on the end 4 in eccentric position, the curved surface 7 slides over the said end until the socket 8 receives it and the whole device is firmly held in position. It is not necessary, therefore, with this invention to have to put or fit the ice-cream receptacle exactly in position.

What I claim as new and desire to secure by Letters Patent, is:

In a freezer, the combination with a vertically disposed drive shaft provided with a keying head, of a receptacle, and a coupling member carried by said receptacle upon the bottom thereof, said member including a curved bottom having a keying socket disposed concentric with the vertical axis of said receptacle, and adapted to receive the said keying head of said shaft, the said member serving to stabilize said receptacle on a plane surface, and the said bottom of said member converging inwardly and upwardly to the said socket, to guide the said head of said shaft thereinto, substantially as and for the purposes set forth.

In testimony whereof I affix my signature in presence of two witnesses.

WILHELM AUGUST MODEL.

Witnesses:
ERNEST ENTENMANN,
FRIDA KLAIBER.

---

Copies of this patent may be obtained for five cents each, by addressing the "Commissioner of Patents, Washington, D. C."